United States Patent
Zhang et al.

(10) Patent No.: US 7,243,137 B2
(45) Date of Patent: Jul. 10, 2007

(54) REMOTE SYSTEM CONTROLLER AND DATA CENTER AND METHODS FOR IMPLEMENTING THE SAME

(75) Inventors: Weiqiang Zhang, San Jose, CA (US); Konstantin I. Boudnik, Santa Clara, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 660 days.

(21) Appl. No.: 10/025,898

(22) Filed: Dec. 19, 2001

(65) Prior Publication Data

US 2003/0074407 A1 Apr. 17, 2003

Related U.S. Application Data

(63) Continuation-in-part of application No. 09/967,646, filed on Sep. 28, 2001.

(51) Int. Cl.
*G06F 15/16* (2006.01)
*G06F 15/177* (2006.01)
*G06F 7/00* (2006.01)

(52) U.S. Cl. .............. 709/219; 709/220; 709/248; 707/10

(58) Field of Classification Search ............ 709/203, 709/219, 224, 204, 220, 248, 217; 701/201; 707/9, 10
See application file for complete search history.

(56) References Cited

U.S. PATENT DOCUMENTS

| | | | |
|---|---|---|---|
| 5,371,883 A | 12/1994 | Gross et al. ............ 714/38 |
| 5,524,253 A | 6/1996 | Pham et al. ............ 709/202 |
| 5,754,701 A | 5/1998 | Kessner ................. 709/219 |
| 5,854,889 A | 12/1998 | Liese et al. ............. 714/43 |
| 5,896,495 A | 4/1999 | Stein et al. ............. 714/38 |
| 5,925,102 A | 7/1999 | Eilert et al. ............ 709/226 |
| 5,948,065 A | 9/1999 | Eilert et al. ............ 709/226 |
| 5,987,376 A * | 11/1999 | Olson et al. ............ 701/201 |

(Continued)

FOREIGN PATENT DOCUMENTS

EP 0 892 530 A 1/1999

OTHER PUBLICATIONS

Arnold, "The Jini Architecture: Dynamic Services In a Flexible Network", *ACM* (1999) pp. 1-6.

(Continued)

*Primary Examiner*—Ario Etienne
*Assistant Examiner*—El Hadji Sall
(74) *Attorney, Agent, or Firm*—Martine Penilla & Gencarella, LLP

(57) ABSTRACT

A process execution management system including a controller system designed to have a data center component and first and second user interface component instances is provided. The data center component includes data required to execute a process by a processing resource in communication with the controller system. The first and second user interface components enable a first user interface and a second under interface to provide interfaces to first and second copies of the data center component, respectively. The first and second user interfaces notify the data center component of changes to the first and second copies of the data center component, respectively. The data center component issues updates including the changes to each of the first and second copies of the data center component to each of the first and second user interfaces to maintain synchronized data.

21 Claims, 10 Drawing Sheets

U.S. PATENT DOCUMENTS

| | | | |
|---|---|---|---|
| 6,058,393 | A | 5/2000 | Meier et al. ................... 707/10 |
| 6,112,243 | A | 8/2000 | Downs et al. ............... 709/226 |
| 6,216,158 | B1 | 4/2001 | Luo et al. ..................... 714/38 |
| 6,263,265 | B1* | 7/2001 | Fera ............................ 701/19 |
| 6,360,268 | B1 | 3/2002 | Silva et al. ................. 709/227 |
| 6,411,991 | B1* | 6/2002 | Helmer et al. .............. 709/217 |
| 6,430,607 | B1* | 8/2002 | Kavner ....................... 709/217 |
| 6,574,628 | B1 | 6/2003 | Kahn et al. .................. 707/10 |
| 6,654,673 | B2* | 11/2003 | O'Neal et al. ................ 701/33 |
| 6,662,217 | B1* | 12/2003 | Godfrey et al. ............. 709/219 |
| 6,697,967 | B1 | 2/2004 | Robertson .................... 714/43 |
| 6,708,324 | B1 | 3/2004 | Solloway et al. ........... 717/124 |
| 6,757,262 | B1 | 6/2004 | Weisshaar et al. .......... 370/310 |
| 6,952,741 | B1* | 10/2005 | Bartlett et al. .............. 709/245 |

OTHER PUBLICATIONS

Edwards, W. K., "Core JINI", *Prentice Hall Ptr.*, Indianapolis, US, Jun. 1999, pp. 64-83, XP002265323 and XP002265392; pp. 136-163, XP002302486; and pp. 297, 305-320, 329, XP002212134.

Pagurek, B., et al., "Management of Advanced Services in H.323 Internet Protocol Telephony", *Proceedings IEEE Infocom 2000. The Conference on Computer Communications. 19th Annual Joint Conference of the IEEE Computer and Communications Societies.* Tel Aviv, Israel, Mar. 2000, *Proceedings IEEE Infocom.*, vol. 3 of 3, Conf. Mar. 2000, pp. 91-100, XP001004237, ISBN: 0-7803-5881-3, pp. 92 and 94.

Paulson, D., "JIVI Project: JINI-Based Intranet Virtual Instruments", *JIVI Project Information,* May 2000, pp. 1-3, XP002302376, URL:http://jivi.org/, retrieved on Oct. 25, 2004.

Sommers, "Activatable Jini Services: Implement RMI Activation", *IBM,* Oct. 24, 2000, pp. 1-12.

Sun Microsystems: "Jini™ Device Architecture Specification" Sun Community Resources, 'Online! Jan. 25, 1999, XP002265322, retrieved from the Internet: <URL:http://wwws.sun.com/software/jini/specs/jini101specs/jini-spec.html>, retrieved on Dec. 16, 2003, paragraphs 01-01.1, and paragraphs 02.1-02.4.

Sun Microsystems: "Jini™ Architecture Overview", Sun Technical Whitepapers, 'Online! Jan. 1999, XP002266391, Retrieved from the Internet: <URL:http://wwws.sun.com/software/jini/whitepapers/architecture.html>, retrieved on Jan. 7, 2004, paragraphs 0001-0002.

\* cited by examiner

REMOTE SYSTEM CONTROLLER AND DATA CENTER AND METHODS FOR IMPLEMENTING THE SAME

CROSS REFERENCE TO RELATED APPLICATIONS

This application is a continuation-in-part of U.S. patent application Ser. No. 09/967,646, filed on Sep. 28, 2001, and entitled "SYSTEM CONTROLLER FOR USE IN A DISTRIBUTED PROCESSING FRAMEWORK SYSTEM AND METHODS FOR IMPLEMENTING THE SAME," which is incorporated herein by reference in its entirety.

BACKGROUND OF THE INVENTION

1. Field of the Invention

The present invention relates generally to software processing, and more particularly, to methods and systems for remotely managing the distribution and scheduling of computing operations.

2. Description of the Related Art

As the use of software in performing daily tasks is increasing rapidly, assessing software reliability through software testing has become an imperative stage in the software development cycle. As is well known, software testing is used to find and eliminate defects (i.e., bugs) in software, which if undetected, can cause the software to operate improperly. In general, software testing may be performed by implementing a stand-alone computer or a network of computer resources. The drawback of using a stand-alone computer system to perform software testing is that the stand-alone computer system must be specifically programmed to run the test selected by the software user. To submit a new test, modify or terminate an existing test, or obtain the status of the tests currently running, the user must physically access the computer lab and the stand-alone computer system. This is extremely inconvenient when the computer lab or the stand-alone computer system is remote or such access is impossible.

Comparatively, when a network of computer resources is used, the users are responsible for manually adding and deleting the computer resources to the network, programming the master computer system and the server, initiating the running of a user-selected test, and running the test on the group of dedicated computer systems coupled to the server. The shortcoming of this scenario is that to accomplish any of these tasks, the user must have physical access to the computer lab housing the master computer system running the network controller. Thus, unless the users can access the computer lab, the users are incapable of performing any of such tasks. Furthermore, at any given time, only a single user can access the controller. This is specifically inconvenient when multiple users, each located are in different remote buildings, attempt to access the controller.

Additionally, in either scenario, a heavy user interface is required for initiating the software testing on the master computer, scheduling the running of the specific test on the system resources, adding and deleting of the system resources, keeping track of the system resources and their respective hardware and software configuration, and maintaining the system resources. Moreover, in either case, the software testing is performed by dedicated system resources. That is, the system resources are designed to solely be used for software testing.

In view of the foregoing, there is a need for a flexible methodology and system to accommodate the remote distribution and scheduling of the processing of a computer software.

SUMMARY OF THE INVENTION

Broadly speaking, the present invention fills these needs by providing a system controller capable of accommodating a plurality of user computer systems to simultaneously schedule, distribute, or monitor the status of a process being executed. In one embodiment, the remote system controller is implemented in a distributed processing framework (DPF) system, allowing a plurality of user computer systems to simultaneously and remotely submit, schedule, or monitor the status of a process being executed using synchronized data. In a different example, the remote system controller is implemented in a distributed test framework (DTF) system and is configured to allow a plurality of remote user computer systems to simultaneously access, submit, schedule, and monitor status of a test suite being executed by cross-platform, dynamically networked distributed computer resources. It should be appreciated that the present invention can be implemented in numerous ways, including as a process, an apparatus, a system, a device, or a method. Several inventive embodiments of the present invention are described below.

In one embodiment, a process execution management system is disclosed. The system includes a controller system configured to have a data center component, a first user interface component instance, and a second user interface component instance. The controller system is accessible over a network, enabling remote user access to data managed by the controller system. The data center component includes data required to execute a process by a processing resource. The processing resource is in communication with the controller system. The first user interface component instance enables a first user interface to provide an interface to a first copy of the data center component. The first user interface is configured to notify the data center component of a change to the first copy of the data center component. The second user interface component instance enables a second user interface to provide an interface to a second copy of the data center component. The second user interface is configured to notify the data center component of a change to the second copy of the data center component. The data center component issues updates that include the changes to each of the first copy of the data center component and the second copy of the data center component to each of the first and second user interfaces. In this manner, the data center component maintains synchronized data between the first and second user interfaces having access to the data center component.

In another embodiment, a method for remotely accessing, scheduling, monitoring, and submitting a process is disclosed. The method includes launching a controller code. The controller code includes a data center and a user interface code. The method further includes registering the data center with a registry service and initiating a first instance of a user interface component by the controller code. Also included is maintaining a data center copy provided to a user interface synchronized with the data center if the data center has received a data change request from a user interface. The method also includes monitoring an active status of the user interface if the data center has not received a data change request to the data center.

In yet another embodiment, a method for providing synchronized data to a plurality of remote user interfaces is disclosed. The method includes launching a controller code having a data center and a user interface code and registering the data center with a registry service. Also included are initiating a first user interface component and providing a copy of the data center to one or more user interfaces upon receiving a request from the one or more user interfaces. The method further includes maintaining and updating a list of one or more active user interfaces. The list of one or more active user interfaces is configured to include a user interface identity and a user interface address for each of the one or more active user interfaces. Further included is maintaining the data center copy and data center synchronized if a data change request is received from any of the one or more user interfaces. The method also includes monitoring an active status of the one or more user interfaces if the data change request has not been received.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION OF THE PREFERRED EMBODIMENTS

Figure 1:
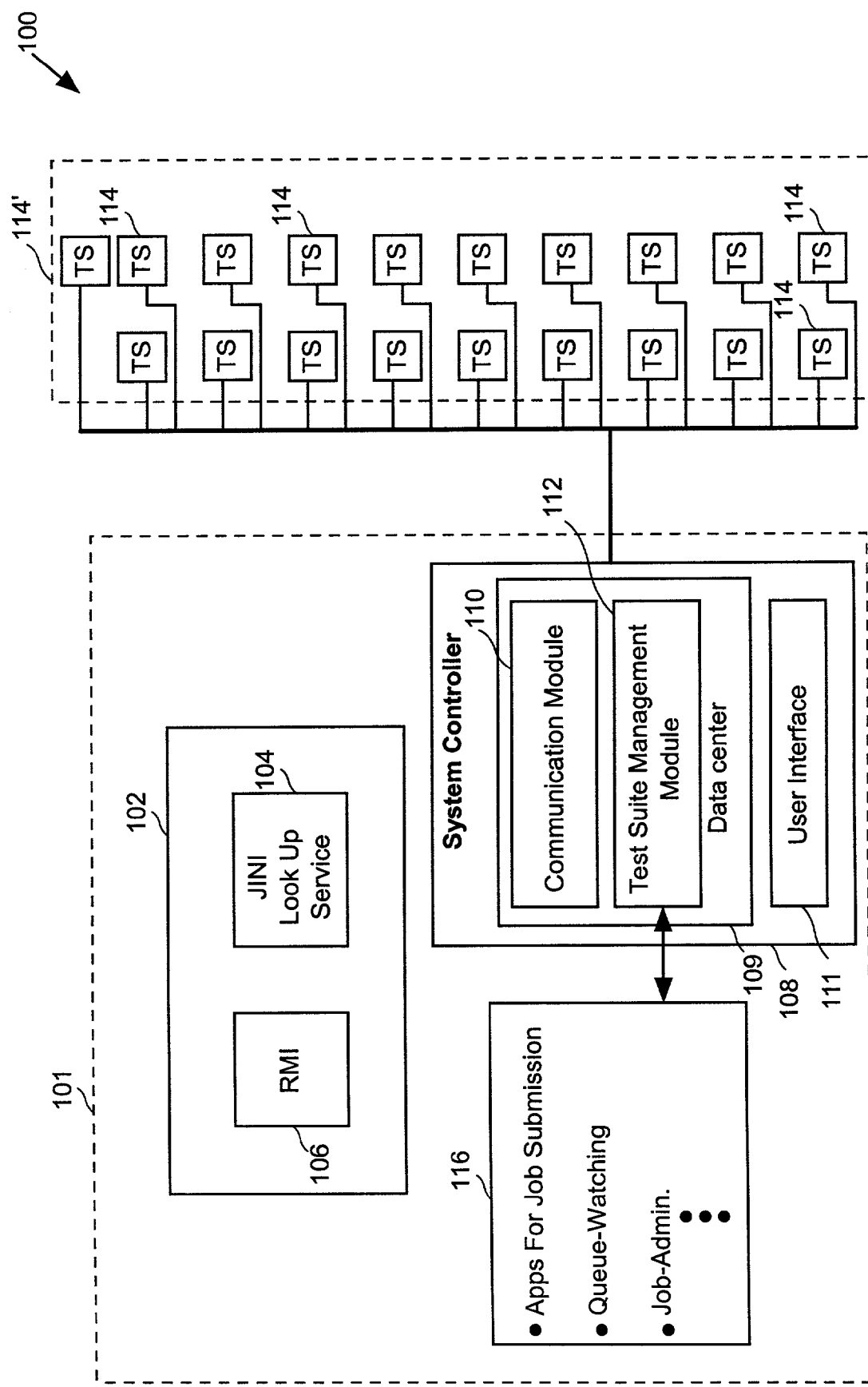
FIG. 1 is a block diagram illustrating a distributed test framework (DTF) system, in accordance with one embodiment of the present invention.

Inventions for a remote system controller for use in a distributed processing framework (DPF) system and methods for implementing the same are disclosed. In the following description, numerous specific details are set forth in order to provide a thorough understanding of the present invention. It will be understood, however, to one skilled in the art, that the present invention may be practiced without some or all of these specific details. In other instances, well known process operations have not been described in detail in order not to unnecessarily obscure the present invention.

The remote system controller of the present invention is capable of accommodating a plurality of user computer systems to simultaneously access, schedule, distribute, or monitor the status of a process being executed. As used herein, "user computer system" can be defined as a system, a monitor, or a port that allows access to a data managed by a data center component of the system controller using the Internet.

In one embodiment, the remote system controller is implemented in a distributed processing framework (DPF) system, allowing a plurality of user computer systems to simultaneously and remotely access, submit, schedule, or monitor status of a process being executed by using data that has been synchronized. In a different example, the remote system controller is implemented in a distributed test framework (DTF) system allowing a plurality of remote user computer system to access, submit, schedule, or monitor status of a test suite being executed by cross-platform, dynamically networked distributed computer resources.

As an overview, the present invention relates to a remote system controller configured to communicate with a plurality of user computer systems as they access, schedule, distribute, and manage a process being executed. In one embodiment, the system controller is configured to include the data center component and a user interface component. The data center is configured to include substantially all data required to execute a test suite while the user interface component is utilized to interact with the user computer systems. The data center component itself includes a management module that is responsible for managing the processing of a submitted process and a communication module designed to manage the communication between the system controller and the distributed processing resources.

In one exemplary embodiment, the remote system controller registers with a registry service (e.g., a look up service) allowing the plurality of user computer systems to locate the system controller, requesting a copy of the data center. Upon receiving such request, a copy of the data center is provided to the user computer system thus enabling the user to access the data in the data center. In one example, the system controller maintains the copies of the data center synchronized implementing a refresh command.

The remote system controller implemented in the DPF system is further configured to have the capability to intelligently select and utilize computer resources of the ad-hoc network of distributed computer resources having either the same or different software/hardware configuration to execute a process. As used herein, an "ad-hoc" or a "dynamic" network is defined as a network in which the processing resources may be part of the network temporarily and for a specific length of time (i.e., spontaneous). In one example, the remote system controller of the present invention is implemented in the DPF system and uses the Jini™ (hereinafter "Jini") technology to provide spontaneous interaction between its components. In this manner, the processing resources attach to and detach from the ad-hoc network of computer resources without disturbing the DPF system. Accordingly, the remote system controller of the present invention has the capability to manage the process being executed by a plurality of processing resources not solely limited to executing processes submitted to the DPF system.

In one exemplary embodiment, the DPF system is a distributed test framework (DTF) system configured to manage test suite execution on cross-platform dynamically networked computer systems. In one implementation, the DTF system includes a server computer system and a plurality of ad-hoc network of resources configured to spontaneously interact implementing a device registry. The server computer system is configured to include the device registry (e.g., Jini look up service) and the system controller configured to manage the processing of the submitted test suites. In one instance, the plurality of test systems join the Jini look up service by registering their respective proxies and corresponding attributes. In one example, the remote system controller searches the look up service for an available and suitable test system to process each of the submitted test suites. Once a test system is selected to run the test suite, the machine service component of the selected computer resource spawns a second service to execute the test suite.

As one embodiment of the present invention implements the Jini technology, a brief introduction to Jini is provided below. Nevertheless, this brief introduction to Jini should not be considered as limiting as Jini technology is well known by those skilled in the art. Jini technology is a network architecture that enables the spontaneous assembly and interaction of services and devices on a network of computer systems. Built on the Java platform, Jini technology eliminates the challenges of scale, component integration, and ad-hoc networking encountered in distributed computing environments. Jini simplifies interactions over a network by providing a fast and easy way for clients to use available services. Jini technology is also configured to be wire-protocol and transport-protocol neutral.

Summarily, Jini network technology includes a communication and programming model that enables clients and Jini services to discover and connect with each other to form an impromptu (i.e., spontaneous) Jini community. As Jini is written in Java, Jini implements the mechanism, Java Remote Method Invocation Application Program Interface (API), to move objects around the network.

In one embodiment, a Jini service is configured to employ a proxy to move around the network. As used herein, the proxy is defined as an object having service attributes and communication instructions. Through implementing discovery and join processes, the Jini services are found and thereafter registered with a look up service on a network. As used herein, registering a service is defined as sending the service proxy to all look up services on the network or a selected subset of the look up services. By way of example, the look up service is equivalent to a directory or an index of available services wherein the proxies for each of the services and their associated code are stored. When a service is requested, the proxy associated with the requested service is sent to the requesting client, thus enabling the client to use the requested service. Once dispatched, the proxy is configured to conduct all communication between the client and the Jini service.

In providing an ad-hoc network of computers, in one embodiment, Jini introduces a concept called "leasing." That is, once a service joins the Jini network, the Jini service registers its availability for a certain period of leased time. This lease period may be renegotiated before the lease time is expired. When a service leaves the Jini network, the service entry in the look up service is removed automatically once the service's lease is expired. For further details on Jini technology, please refer to K. Arnold et al., The Jini Specification (1999) and W. Keith Edwards, Core Jini (1999).

As Jini is implemented in the Java™ (hereinafter "Java") programming language, in a like manner, an overview of Java is provided below. In operation, a user of a typical Java based system interacts with an application layer of a system generally written by a third party developer. The application layer generally provides the user interface for the system. A Java module is used to process commands received by the application layer. A Java virtual machine is used as an interpreter to provide portability to Java applications. In general, developers design Java applications as hardware independent software modules, which are executed Java virtual machines. The Java virtual machine layer is developed to operate in conjunction with the native operating system of a particular hardware, which represents the physical hardware on which the system operates or runs. In this manner, Java applications can be ported from one hardware device to another without requiring updating of the application code.

Unlike most programming languages, in which a program is compiled into machine-dependent, executable program code, Java classes are compiled into machine independent byte code class files which are executed by a machine-dependent virtual machine. The virtual machine provides a level of abstraction between the machine independence of the byte code classes and the machine-dependent instruction set of the underlying computer hardware. A class loader is responsible for loading the byte code class files as needed, and an interpreter or just-in-time compiler provides for the transformation of byte codes into machine code.

More specifically, Java is a programming language designed to generate applications that can run on all hardware platforms, small, medium and large, without modification. Developed by Sun, Java has been promoted and geared heavily for the Web, both for public Web sites and intranets. Generally, Java programs can be called from within HTML documents or launched standalone. When a Java program runs from a Web page, it is called a "Java applet," and when run on a Web server, the application is called a "servlet."

Java is an interpreted language. The source code of a Java program is compiled into an intermediate language called "byte code". The byte code is then converted (interpreted) into machine code at runtime. Upon finding a Java applet, the Web browser invokes a Java interpreter (Java Virtual Machine), which translates the byte code into machine code and runs it. Thus, Java programs are not dependent on any specific hardware and will run in any computer with the Java Virtual Machine software. On the server side, Java programs can also be compiled into machine language for faster performance. However a compiled Java program loses hardware independence as a result.

Keeping these brief overviews to Jini and Java as they relate to the present invention in mind, reference is now made to FIG. 1 illustrating a block diagram of a distributed test framework (DTF) system 100, in accordance with one embodiment of the present invention. As shown, physically, the DTF system 100 includes two groups of computer systems: (1) a system server group 101, and (2) a test system group 114'. The system server group 101 includes a service component 102 and a system controller 108. The service component 102 is configured to contain a Jini look up service 104 and a Remote Method Invocation (RMI) 106. In one embodiment, the RMI is designed to handle various communication needs. Comparatively, the Jini look up service 104 is a dedicated process running on the master computer system, server, and is configured to function as a central registry. As used herein, the master computer system is defined as the computer system running the system controller 108. As designed, in one embodiment, the master computer is configured to include both the system controller 108 and the service component 102. However, in a different implementation, each of the system controller 108 and the service component 102 may be included and run by separate computer systems. As designed, the look up service 104 is configured to enable the system controller 108 to locate available computer systems of an ad-hoc network of computer systems to execute a given test execution request using the test system registerable attributes. For instance, the look up service 104 includes registerable attributes, which identify the test machine platform, operating system, and other software and hardware characteristics.

The illustrated system controller 108 includes a data center component 109 and a user interface component 111. Broadly speaking, the user interface 111 is utilized to interact with the user computer systems. For instance, in one example, a user computer system interacts with the system controller by obtaining instances of the user interface component. The data center component 109 of the remote system controller 108 is configured to include substantially all data required to execute a test suite. By way of example, a sample data center may include data such as, the number of test execution requests currently being processed or waiting to be processed, the number of test systems available to execute a certain type of a test suite, the status of the test suites being executed, etc.

As shown, in one embodiment, the data center 109 includes a communication module 110 and a test suite management module 112. The communication module 110 manages the communication between the system controller 108 and the distributed test systems 114. For instance, the communication module 110 is responsible for locating available test systems 114, running test execution requests, and gathering information regarding the status of the test systems 114. In one example, the system controller 108 manages the communication with the distributed test systems 114 by implementing a plurality of threads. In this manner, the system controller 108 has the capability to communicate with a plurality of test systems 114 in parallel. However, it must be noted that in a different embodiment, the system controller 108 may implement any suitable mechanism to manage the communication between the system controller 108 and the distributed test systems 114 (e.g., Jini, RMI, Transport Commit Protocol/Internet Protocol (TCP/IP) sockets, etc.).

The test suite management module 112 is responsible for managing the processing of the submitted test suites and the test execution requests. As used herein a test suite is a comprehensive list of data files having commands specifically programmed to initiate a number of functional aspects of the software product being tested. For instance, if the software product being tested is a word processing program, the test suite may activate a spell check command, a cut test command, a paste command, etc. Thus, once the test suite is executed, the test results reveal whether any of the tested commands failed to operate as intended. Also as used herein, once submitted for processing, each test suite becomes a "test execution request." As the processing of different portions of the test suite can be assigned to different test machines, the test suites may be divided into a plurality of test execution requests (i.e., jobs).

By way of example, the test suite management module 112 maintains an inqueue directory designed to include almost all the submitted test execution requests. Once the system controller 108 is initiated, the system controller 108 is configured to read each test execution request from files held in the inqueue directory. Once a test execution request is read, it is put into either a wait queue configured to hold test execution requests waiting to be executed or an execution queue designed to hold test execution requests currently being executed. Further information regarding managing the inqueue directory, wait queue, and execution queue will be provided below. As illustrated, in one example, the test suite management module 112 is configured to manage the software applications and user interfaces implemented for job submission, queue watching, job administration, etc., as shown in 116.

The test system group 114' includes a plurality of test systems 114 having similar or diverse hardware and software configuration. Although shown as a group, the test systems 114 are not necessarily limited to testing. In fact, the test systems 114 can be computers or systems used by employees of a company for normal desktop work. So long as the test systems 114 are associated with the networked group, the processing power of these test systems 114 can be used. In one embodiment, the test systems 114 can be used during normal working ours when the test systems 114 are running, for example, business applications, or during off hours, thus tapping into potentially huge processing resources that would otherwise be left unused. It should therefore be appreciated that test systems 114 do not necessarily have to be solely dedicated to testing or processing for the system server group 101.

In one embodiment, the test systems 114 are configured to execute the test execution requests dispatched by the system controller 108. Each of the test systems 114 runs an agent process (not shown in this Figure) designed to register the respective test system 114 with the Jini look up service 104. In this manner, the agent process for each test system 114 advertises the availability of the associated test system 114. As will be discussed in further detail below, a machine service component of the agent is used to establish communication between the associated test system 114 and the system controller 108. Specifically, by implementing the Jini attributes, the machine service registers the test system 114 characteristics with the Jini look up service 104. The test system 114 attributes are subsequently used by the system controller 108 to locate a test system 114 suitable to execute a specific test execution request.

While the DTF system 100 can physically be divided into two groups, logically, the DTF system 100 is comprised of three over all parts: (1) Job submission and other user interfaces; (2) Test scheduler and system controller; and (3) Test execution on remote or local systems.

For the most part, the job submission and other user interfaces component is a job queuing system having a variety of applications and user interfaces. As designed, the job submission component is configured to perform several tasks such as handling job submission, managing queues, administrating jobs, and administrating the ad-hoc network of the distributed test systems.

By way of example, in one implementation, the user interface may be as follows:

Launch system controller: In one embodiment, launching the system controller 108 is performed by running an appropriate shell script. As designed, the shell script is configured to launch the Jini and RMI support servers.

Kill system controller: Finds substantially all the processes, and once found kills each of the processes, individually.

Submit jobs: Before the system controller 108 is launched, an Extensible Markup Language (XML) formatted test-execution-request file is created in the inqueue directory (e.g., that is preferably part of the test suite management module). In this manner, once the system Controller 108 is launched, the system controller 108 scans the inqueue directory, thus entering almost each and every test execution request into the in-queue (the in-queue being an actual queue, as contrasted with the inqueue directory).

Check queue: In one embodiment, a stopgap Graphical User Interface (GUI) is provided.

Cancel/administer a job: In one implementation, a stopgap GUI is implemented.

Other administrative tasks: In one exemplary embodiment, additional user interfaces are included. For instance, in certain cases, the system controller 108 is configured to implement various input files.

The second logical component, the test scheduler and system controller, includes the system controller 108 configured to perform the function of managing the job queues and dispatching the test execution requests to test system 114 for processing. Thus, the system controller 108 is configured to manage both; the wait queue (i.e., the queue containing the test execution requests waiting to be executed) and the execution queue (i.e., the queue containing test execution requests currently being executed). In one embodiment, the in-queue is analogous to the wait queue.

As designed, the test scheduler and system controller component is configured to include four modules:

Suite MGR: This module maintains a list of the available test suites stored in a known location in the file system. As designed, the test suite descriptions are stored in an XML formatted file in a suite directory.

Log MGR: This module is configured to handle the logging of activities inside the system controller 108 by implementing a plurality of log files having XML format. For instance, this is particularly useful for debug tracing and system statistics charting.

Queue MGR: This module is designed to maintain the two queues, wait queue (i.e., the in-queue) and the execution queue. Specifically, while a job is in any of the queues, an XML formatted file is kept in the queue directory reflecting the current status of the job. Each test execution request is configured to have a list of attributes describing the system characteristics required to execute the test execution request. Scheduler: This module is configured to manage the dispatch of the test execution requests from the wait queue to the execution queue. In one embodiment, a job is dispatched when (a) the time to execute the job has been reached, and (b) a test system 114 having the required characteristics is available to execute the job.

In accordance with one implementation, the requirements for a DTF system are provided below in Table 1.

TABLE 1

Client-Server Test Frame Requirements

| | | Accessments | Notes |
|---|---|---|---|
| Requirements | | | |
| Tool Requirements (e.g., javatest, jtreg, tonga, shell, etc.) | | Green | |
| Test Execution Requirements | Clean Environment | Green | |
| | Setup | Green | |
| | Execute test suite | Green | |
| | Post-processing | Red | In one example, there are no post actions. |
| | Get test results | Green | |
| | Clean Environment | Green | |
| Other Requirements | | | |
| Error Handling | Crashing | Yellow | In one example, a method is implemented to stop the system. |
| | Hanging | Yellow | |
| Notification (When done) | | Green | |
| Machine Requirements (MKS, Patches) | | Green | |
| Test Suites Available | | Yellow | In one example, a suite path is passed through a plurality of command arguments |
| JDKs Available | | Yellow | In one embodiment, java.exe is in the path environment |
| Machine Use Detection | | Red | |
| Queue Test Suites | | Red | |

TABLE 1-continued

Client-Server Test Frame Requirements

| | | Accessments | Notes |
|---|---|---|---|
| GUI Requirements | | | |
| Machine Characteristics Matrix | | Red | |
| Result Comparison | | Red | |
| Golden JDK results | | Red | |
| Stop/Destroy Test | | Green | |
| User Profiles/Managements | | Red | |
| Logs | | Green | |
| Test Result Notification | | Red | |
| Scheduling Test | | Red | |
| Machine Statistics (Idle time, Usage Profile) | | Red | |
| Error Recovery (Net Problems) | | Red | |
| Fault Tolerant | | Yellow | In one example, fault tolerant is performed by a plurality of actions based on coordination protocol, thus minimizing faults. |
| Scaleable | | Green | In one embodiment, test suites can be easily added or deleted. |
| Demon Requirements | Version # (Compatibility) | Red | |
| | Machine Descriptions | Yellow | In one example, Demon Requirements are the basic configurations (e.g., OS, version, etc.). |

Figure 2:
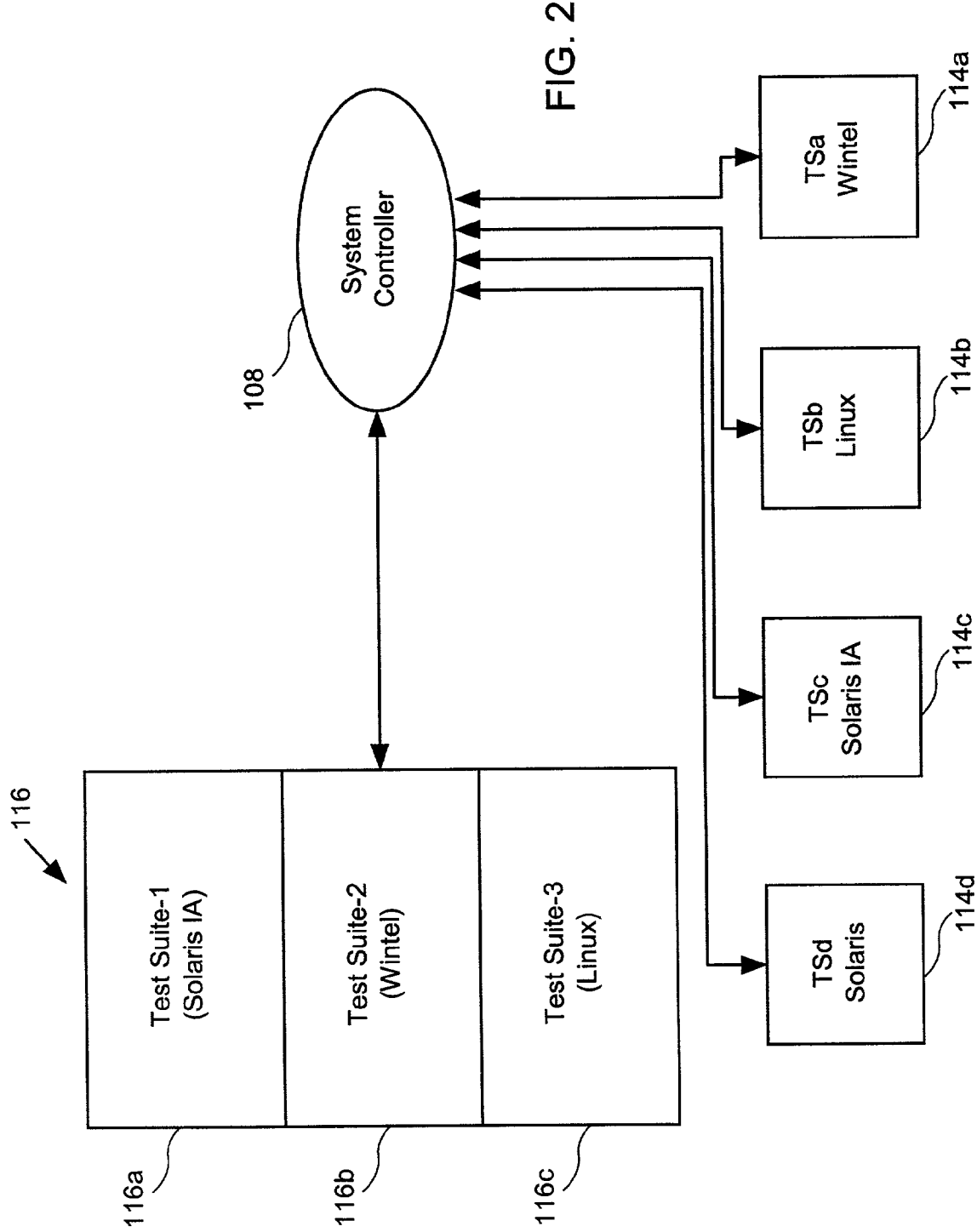
FIG. 2 is a block diagram illustrating the capability of the present invention to intelligently locate an available and suitable test system to execute a test suite, in accordance with another embodiment of the present invention.

Reference is made to a block diagram depicted in FIG. 2 wherein the capability of the DTF system to intelligently locate a test system 114 available to execute a test suite is illustrated, in accordance with one embodiment of the present invention. As shown, an inqueue directory 116 contains a plurality of test execution requests 116a, 116b, and 116c. In accordance with one embodiment of the present invention, once the system controller 108 is initiated, the system controller 108 is designed to read each test execution request 116a-116c contained within the inqueue directory 116. As shown, each test suite request 116a-116c must be executed by a test system 114 capable of running the test execution request requirements. For instance, each of the test execution requests 116a, 116b, and 116c must be run on a Solaris IA™ test system, a Wintel™ test system, or a Linux™ test system, respectively. As will be described in more detail below, the DTF system 100 has the capability to advantageously locate an available test system from a plurality of ad-hoc network of test systems 114a, 114b, 114c, and 114d to execute each of the test execution requests 116a-116c.

As shown in the embodiment depicted in FIG. 2, each of the test systems 114a-114d has a different software and hardware configuration. For instance, while the test system 114a is run on Wintel™ and the test system 114b is run on Linux™, the test systems 114c and 114d are programmed to run on Solaris IA™ and Solaris™, respectively. As will be discussed in more detail below, the machine service for each test system 114a-114c registers the respective test system 114a-114c with the Jini look up service using the Jini attributes. Particularly, the embodiments of the present invention are configured to register the hardware and software configuration for each test system 114a-114d with the Jini look up service 104. In this manner, the system controller 108 can search the Jini look up service 104 implementing the test execution request requirements as search criteria. Thus, as shown in the example of FIG. 2, the system controller 108 of the present invention selects the test systems 114c, 114a, and 114b to execute the test suite requests 116a-116c, respectively.

Figure 3:
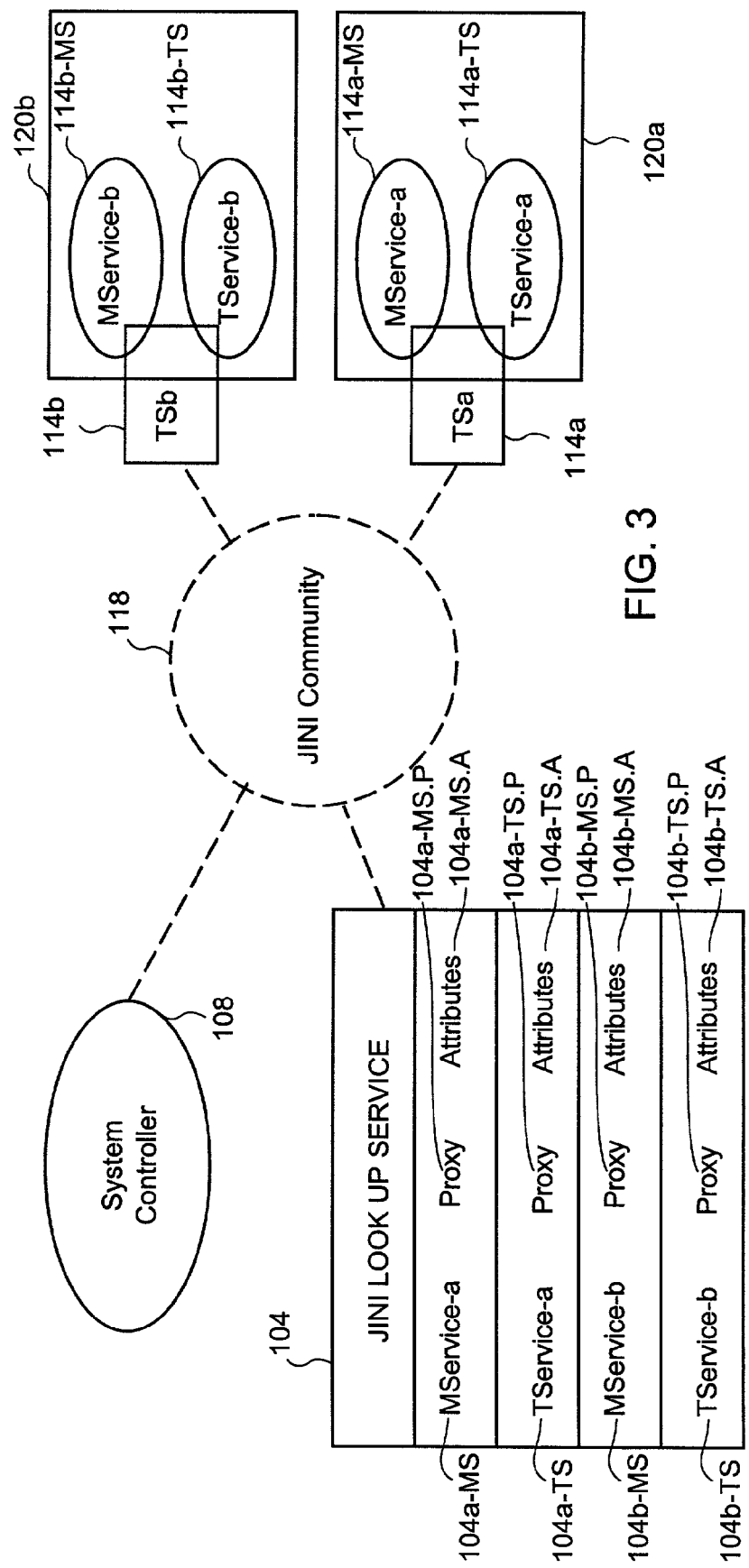
FIG. 3 is a block diagram illustrating the implementation of the test system attributes to locate a suitable test system to process a test execution request, in accordance with yet another embodiment of the present invention.

Implementing the test system attributes to locate a suitable test system to run a test execution request can further be understood with respect to the block diagram shown in FIG. 3, in accordance with one embodiment of the present invention. As shown, the test systems 114b and 114a, the system controller 108, and the Jini look up service 104 communicate to each other using Jini. In one example, the system controller 108, the Jini look up service 104, and the test systems 114a and 114b and all the other resources that are Jini enabled form a virtual Jini community 118.

As shown, the test system 114a runs an agent process 120a responsible for notifying the Jini look up service 104 of the existence and configuration of the test system 114a. In one example, the agent 120a is also designed to export a downloadable image of itself. Beneficially, the downloadable image allows the system controller 108 to ask the test system 114a to initiate running a test execution request while interacting with the test system 114a as the test execution request is being processed.

The illustrated agent 120a involves two Jini services, machine service 114a-MS and test service 114a-TS. The function of the machine service 114a-MS is to advertise the availability of the test system 114a, the characteristics of the test system 114a, and the ability of the test system 114a to launch a test execution request. Additionally, the machine service 114a-MS is designed to be present on the test machine 114a at all times. As such, the machine service 114a-MS is initiated on the test system 114a at the start-up time and is configured to remain active on the test system 114a until the test system 114a is shut down.

Comparatively, the test service 114a-TS is a module configured to encapsulate the test execution request. As designed, the test service 114a-TS is spawned by the machine service 114a-MS and is subsequently launched when the machine service 114a-MS receives a request to start running a test execution request from the system controller 108. Specifically, the new test service 114a-TS is spawned based on the test execution request type. By way of example, in one embodiment, the machine service 114a-MS spawns separate test systems 114a-TS when running Tonga-type, JCK-type, JTREG-type, and shell-type test suites. However, one having ordinary skill in the art must appreciate that in a different example, the machine services are configured to spawn other suitable test systems. As shown, similar to test system 114a, the test system 114b is configured to include an agent 120b designed to include a machine system 114b-MS and a test system 114b-TS.

As will be discussed in more detail below and as shown in the implementation of FIG. 3, the machine service 114a-MS and test service 114a-TS, respectively, register Jini attributes 104a-MS.A and 104a-TS.A of the test system 114a with the Jini look up service 104. For instance, in one embodiment, the sequence of events in registering the machine service 114a-MS and test service 114a-TS may be as follows: Once the test-system 114a discovers and joins the Jini community 118, the test service 114a-MS of the test system 114a registers with the Jini look up service 104. In this manner, the machine service 114a-MS registers a machine service proxy 104a-MS.P and the attributes 104a-MS.A of the machine service 114a-MS with the look up service 104. The Jini attributes 104a-MS.A are then used by the system controller 108 to locate a test service having attributes suitable to run the test execution request.

Once the test system 114a has been selected to run the test execution request, the machine service 114a-MS spawns a test service 114a-TS having the same type as the test execution request. As discussed above, the machine service 114a-MS is configured to spawn a matching test service 114a-TS for each test execution request type. For example, the test system 114a may have the attributes to run a Tonga test execution request and a JTREG type test execution request. In such a situation, the Jini look up service 104 will include two test services each running a different type of test execution request. As a consequence, when the processing of one type of test execution request has concluded, the test service 114a-TS having substantially the same type can be terminated. Thus, for the most part, the test service 104a-TS, 104a-TS.A, and 104-TS.P are designed to substantially exist while the test system 114a is running a test execution request. In this manner, the system controller 108 can determine whether the test system 114a is processing a test execution request. Specifically, this is achieved by the system controller 108 simply querying the Jini look up service 104 as to whether the test system 114a has an associated existing test service.

In addition to registering the attributes 104a-MS.A and 104a-TS.A, the machine service 114a-MS and the test system 114a-TS are configured to respectively register a corresponding machine service proxy 104-MS.P and a respective test service proxy 104-TS.P with the Jini look up service 104. As designed, the system controller 108 implements the machine service proxy 104-MS.P and the test service proxy 104-TS.P to communicate with the test system 114a. Particularly, once the system controller 108 has selected the test system 114a to run the test execution request, the system controller 108 downloads the machine service proxy 104-MS.P from the Jini look up service 104. Once the machine service proxy 104-MS.P is downloaded, the system controller 108 starts communicating with the machine service proxy 104-MS.P rather than communicating directly with the corresponding test system 114a or the machine service 114a-MS.

In a like manner, the test service proxy 104-TS.P is the communication channel between the system controller 108 and the test service 114a-TS. Thus, similar to the machine service 114a-MS, the system controller 108 downloads the test service proxy 104-TS.P from the Jini look up service 104. Thereafter, the system controller communicates with the test service proxy 104-TS.P as if communicating with the test system 114a or the test service 114a-TS. As shown, in the same manner, the machine service 114b-MS and test service 114b-TS register their respective machine service proxy 104b-MS.P and machine service attributes 104b-MS.A as well as the respective test service proxy 104b-TS.P and test service attributes 104b-TS.A with the Jini look up service 104.

Figure 4A:
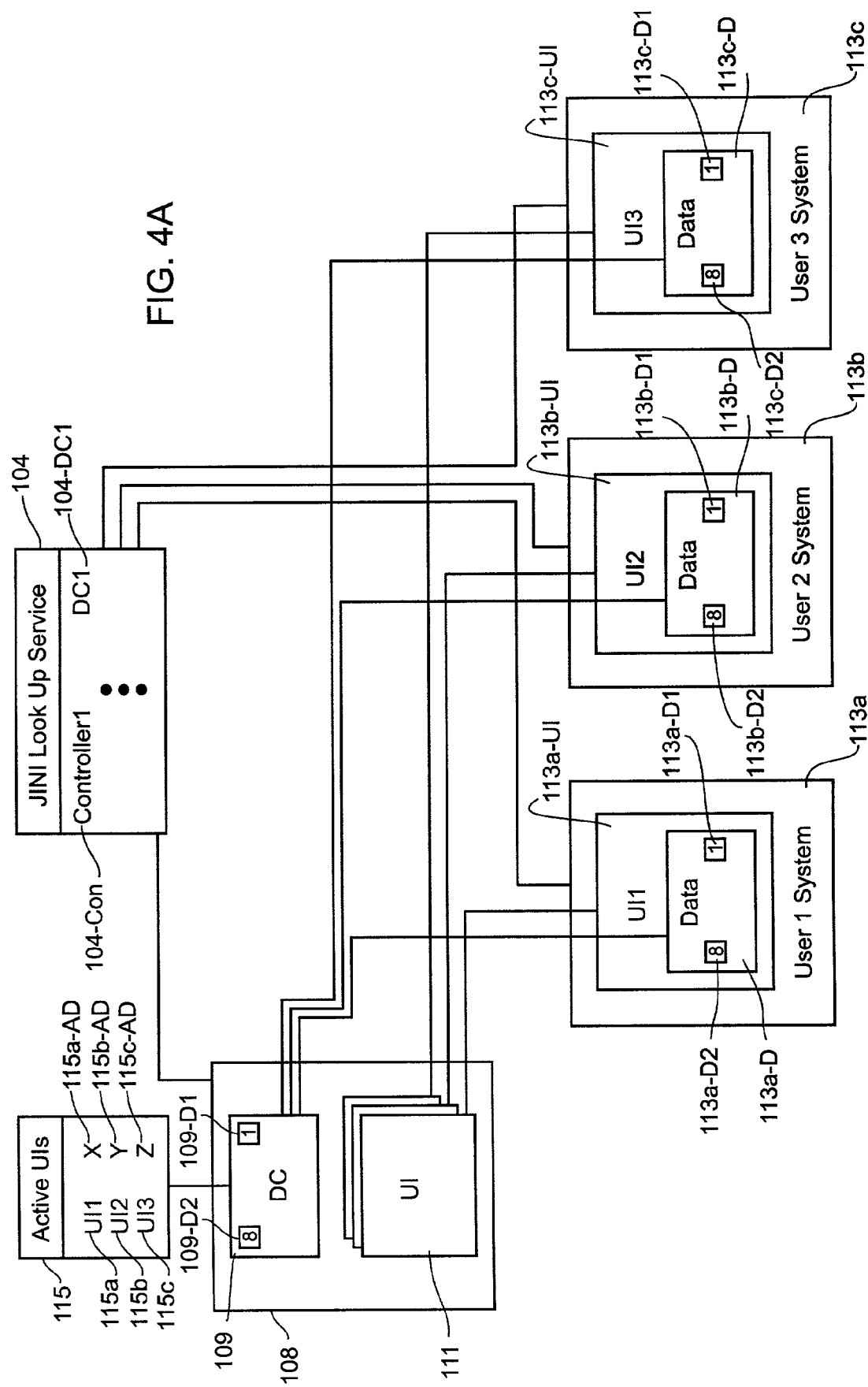
FIG. 4A is a block diagram illustrating the capability of the remote system controller to communicate with a plurality of remote user computer systems designed to submit, schedule, or monitor the status of a process being executed, in accordance to yet another embodiment of the present invention.

The ability of the remote system controller of the present invention to interact with a plurality of remote user computer systems capable of accessing, submitting, scheduling, and monitoring the status of a process being executed can further be understood with reference to the block diagram of FIG. 4A, in accordance to one embodiment of the present invention. As shown, the data center 109 is configured to register with the Jini look up service 104 creating the entry controller1 104-con and its associated registered data center1 104-DC1. In one example, the DC 109 is registered with the look up service 104 upon launching of the remote system controller 108.

As illustrated, a plurality of user computer systems 113a, 113b, and 113c are in communication with the Jini look up service 104. In one embodiment, the user computer systems 113a-113c are user interfaces capable of accessing a test suite being executed, submitting a test suite execution request, scheduling a test suite for execution, or monitoring the status of a test suite being currently executed. In one exemplary embodiment, this task is achieved by the user computer systems 113a-113c communicating with the look up service 104, each requesting a copy of the data center DC1. In doing so, each of the user computer systems 113a-113c is configured to identify itself to the Jini look up service 104 and to provide the Jini look up service 104 with its address. Once the Jini look up service 104 receives the user computer systems 103a-103c requests for a copy of the data center, the Jini look up service communicates with the data center component 109 relaying the user computer systems 103a-103c desire to obtain a copy of the data center 109. At this point, the Jini look up service 104 provides the identities as well as addresses of the user computer systems 113a-113c to the data center 109. Using instances 1, 2, and 3 of the user interface component 111, the data center 109 provides the respective user computer systems 113a-113c with copies of the data center 109. By way of example, instances 1, 2, and 3 of the user interface 111 component respectively communicate with user interfaces 113a-UI, 113b-UI, and 113c-UI of the corresponding user computer system 113a-113c. As shown, each of the user computer systems 113a-113c maintains a copy of the data center 109 in a respective data component 113a-D, 113b-D, and 113c-D. As will be explained in more detail below, the copies of the data center 109 maintained by the user computer systems are configured to be substantially synchronized, almost eliminating the possibility of utilizing outdated data. Maintaining mirror images of data within the data center 109 by the user computer systems 113a-113c is illustrated in FIG. 4A. As shown, the data components 113a-D, 113b-D, and 113c-D each includes a pair of corresponding sample data 113*a*-D1 and 113*a*-D2, 113*b*-D1 and 113*b*-D2, and 113*c*-D1 and 113*c*-D2 designed to match a pair of sample data 109-D1 and 109-D2 in the data center 109.

Besides maintaining data synchronized, data center 109 is configured to maintain a list of active user interfaces and their associated addresses. For instance, a list of active user interfaces (i.e., UI1 115*a*, UI2 115*b*, and UI3 115*c*) and their associated addresses (i.e., address x 115*a*-ad, address y 115*b*-ad, and address z 115*c*-ad) are maintained in a list as shown in 115. Using this data, the data center 109 can maintain the copies of data center on each of the user computer systems synchronized.

Figure 4B:
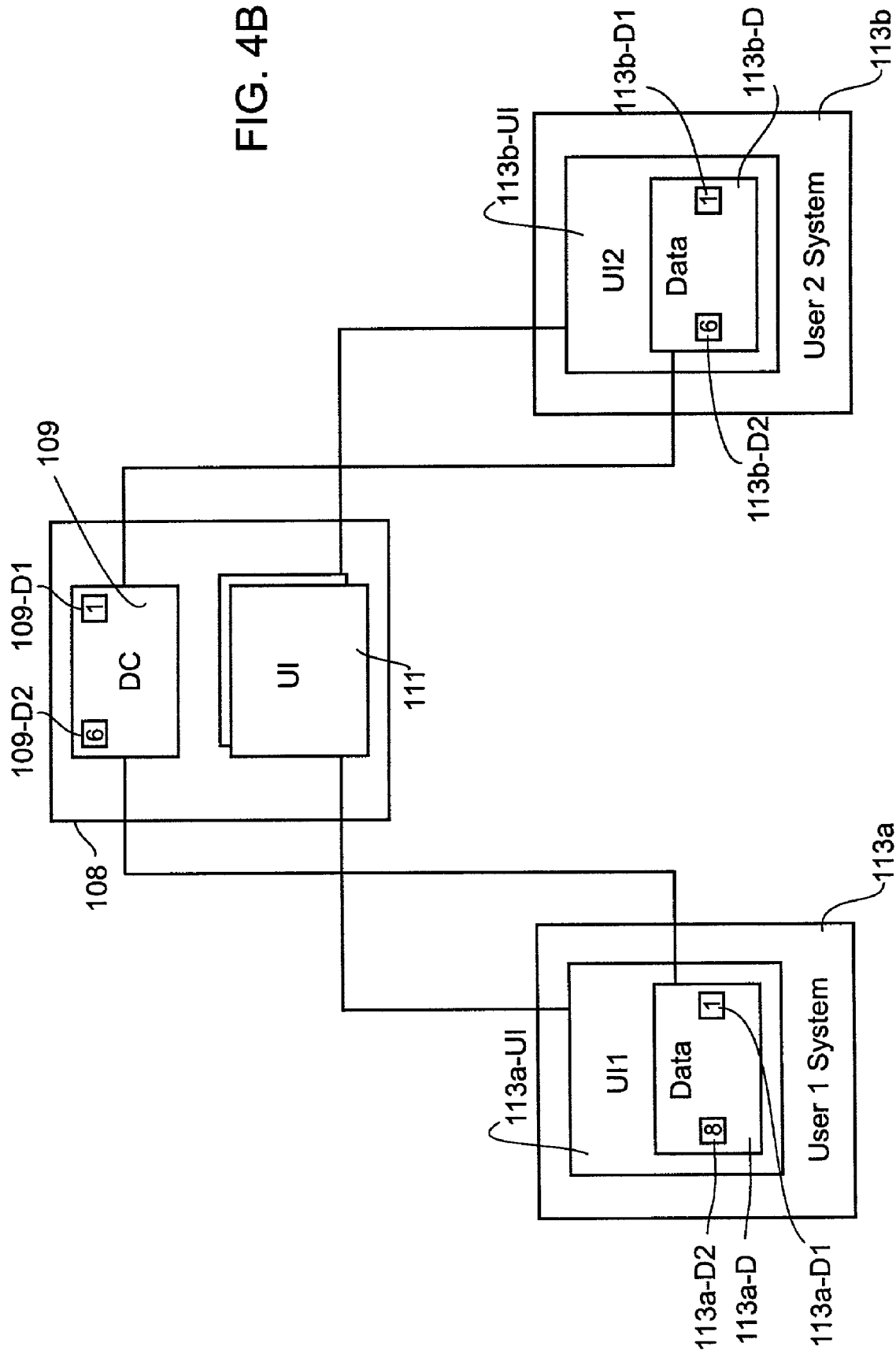
FIG. 4B is a block diagram depicting the one-to-one communication between the remote system controller and a plurality of user computer systems, in accordance to still another embodiment of the present invention.

The capability of the remote controller system of the present invention in maintaining copies of data center synchronized can further be understood with respect to FIG. 4B. As shown, the user computer system 113*b* has modified data in its copy of the data center. That is, the user computer system 113*b* has modified the sample data 113*b*-D2 from an "8" to a "6." As shown in the embodiment of FIG. 4B, the user computer system 113*b* communicates this modification to the data center 109, requesting the change in the sample data 109-D2 contained within the data center. Upon receipt of this request, the data center 109 changes the sample data 109-D2 within the kernel copy of the data center 109 to reflect the new data "6." In one embodiment, any modification of data requested by any of the user computer systems should be approved by the data center 109. In this manner, the accessing, scheduling, submitting, or monitoring of inconsistent data is prevented.

Once the main sample data 109-D2 is modified by the data center 109, the data center 109 is required to maintain the sample data within the remaining active copies of the data center synchronized. In the exemplary embodiment of FIG. 4B, the data center 109 is required to update the copy of the data center in the user computer system 113*a*. As will be discussed in more detail below, in one example, this is achieved by the data center 109 dispatching a "refresh" command to all active user computer systems. Upon receiving the refresh command from the data center 109, the user computer system 113*a* is configured to modify data 113*a*-D1 making it a mirror image of the sample data within 109-D2. Upon achieving this task, the user computer system 113*a* is configured to dispatch a "refresh acknowledged" command to the data center 109 signaling the successful synchronization of the data 113*a*-D of user computer system 113*a*.

Figure 5A:
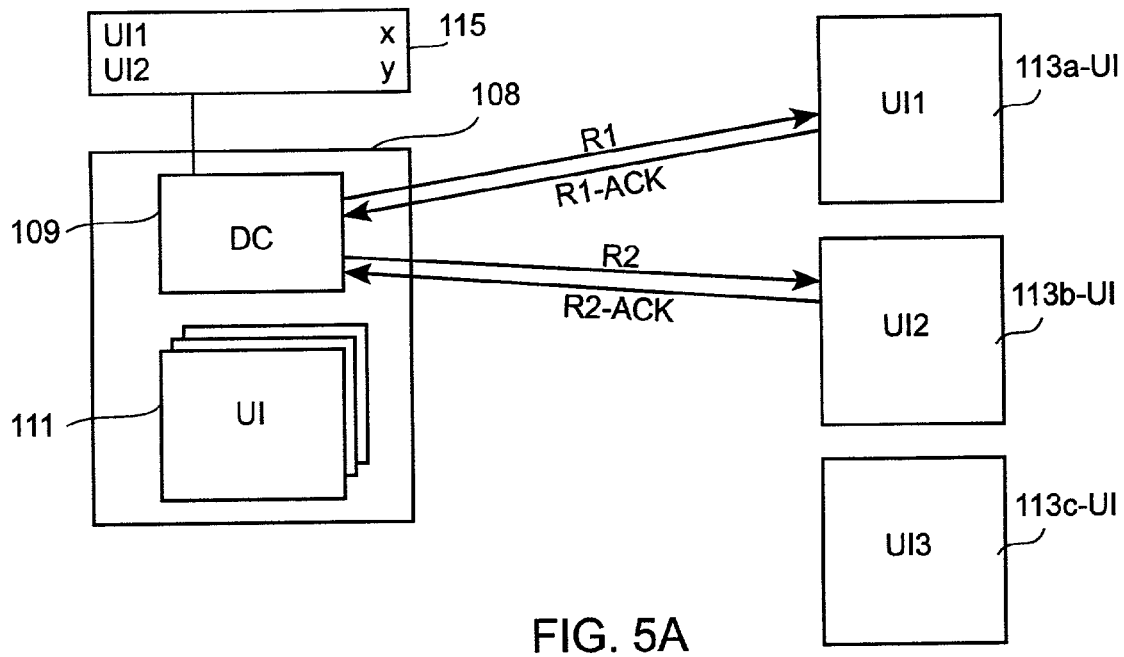
FIG. 5A is a block diagram showing the interaction between the remote system controller and a plurality of users, in accordance with still another embodiment of the present invention.
Figure 5B:
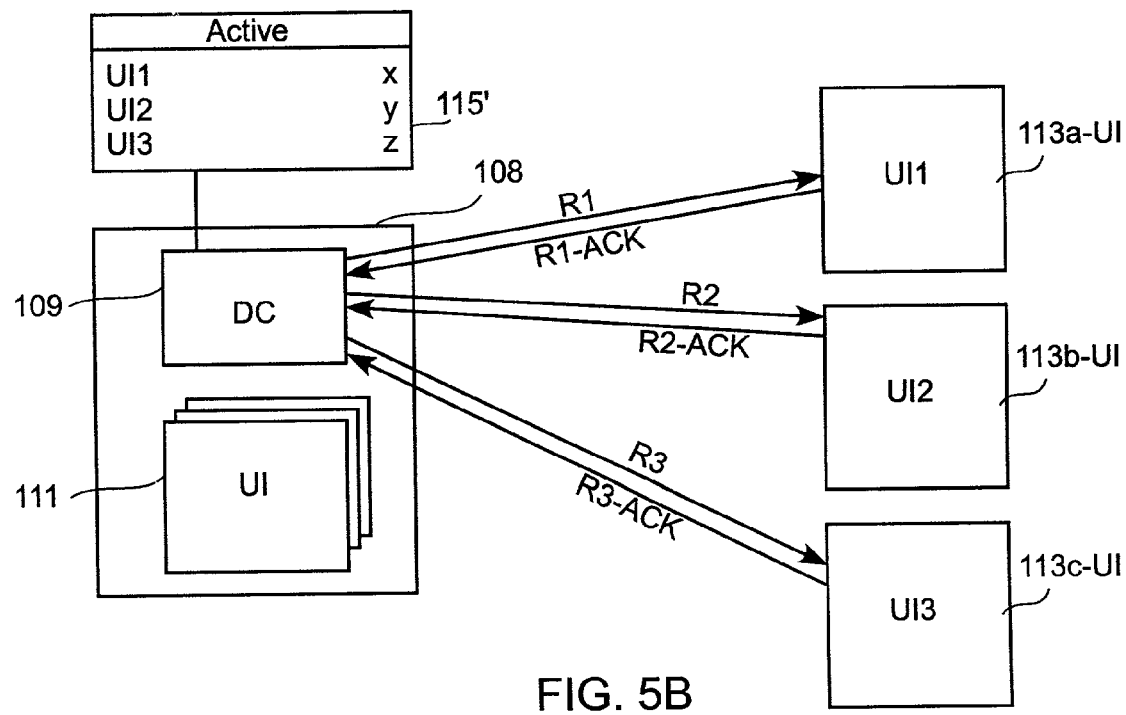
FIG. 5B is a block diagram showing the interaction between the remote system controller and a plurality of users, in accordance to yet another embodiment of the present invention.

Refreshing the copies of data within the user computer system 113*a*-113*c* using the refresh command and refresh acknowledged command can further be understood with respect to FIGS. 5A and 5B. As shown in FIG. 5A, once the data center 109 receives user computer system request to modify data within the data center 109, the data center updates the copies of data within each user computer system, ensuring the integrity of data used by all user computer systems. In one example, the data center achieves this task by dispatching the refresh command sequentially to all user computer systems. For instance, first, the data center 109 dispatches a refresh command R1 to user computer system 113*a*, refreshing data shown on user interface 113*a*-UI. Thereafter, in one example, an internal clock system within the data center 109 is initiated, awaiting the receipt of an acknowledgment command from the user interface 113*a*-UI. Upon receiving the refresh acknowledged R1-Ack command from the user interface 113*a*-UI, the data center proceeds to dispatching a refresh command R2 to the user interface 113B-UI. Again, at this point, the data center awaits receiving the refresh acknowledged command from the user interface 113*c*-UI. Once the refresh acknowledged command R2-Ack is received from the user interface 113*c*-UI, as shown in 115', the data center 109 keeps updating the list of active user computer systems contained within the box.

As shown in the embodiment of FIG. 5B, the data center moves on to dispatching a refresh command R3 to the user interface 113*c*-UI and awaits the receipt of the refresh acknowledged R3-Ack command. Upon receiving the acknowledgment, the data center 109 updates the list of active user interfaces in 115'. As shown, the list of active user interfaces in 115' includes the user interface 113*c*-UI.

Figure 6A:
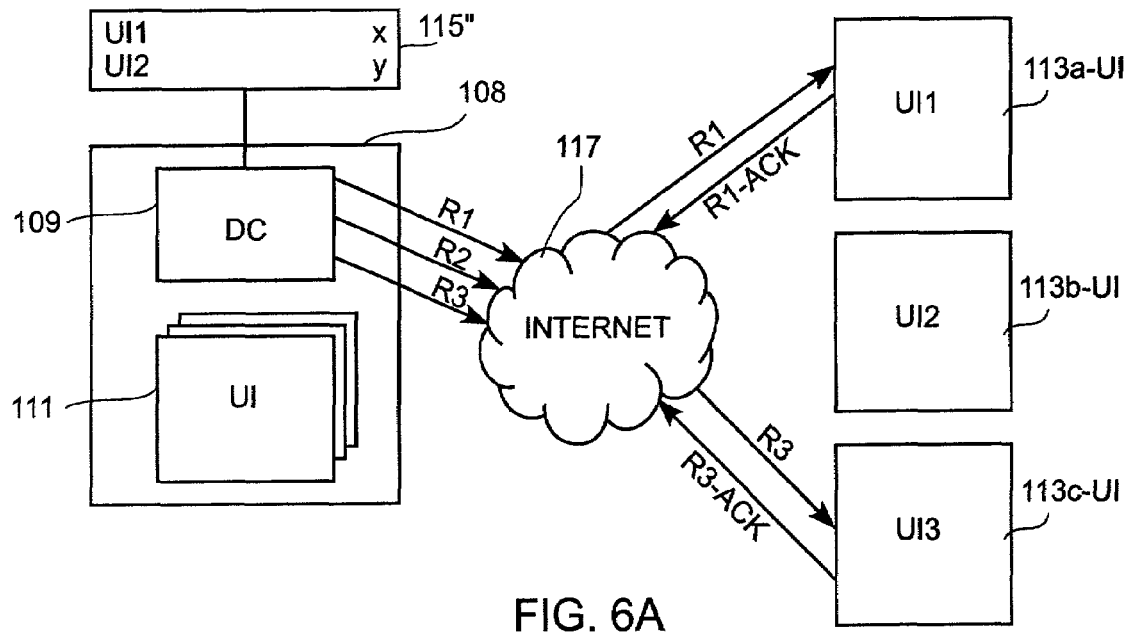
FIG. 6A is a block diagram showing the interaction between the remote system controller and a plurality of users via an Internet, in accordance to yet another embodiment of the present invention.
Figure 6B:
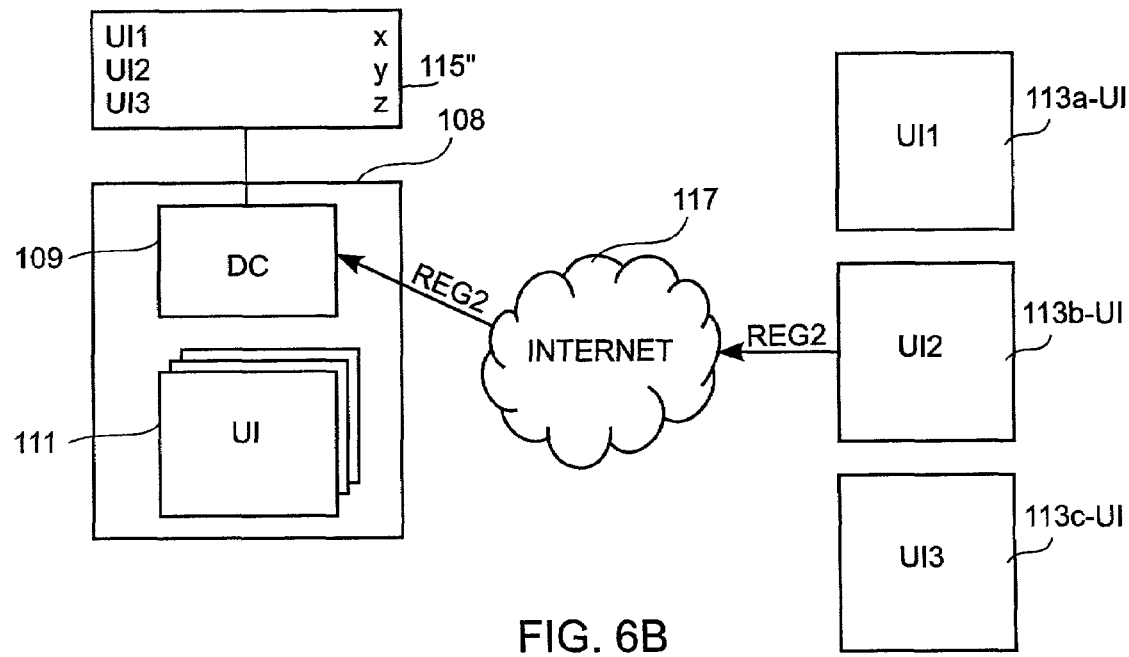
FIG. 6B is a block diagram showing the interaction between the remote system controller and a plurality of users via an Internet, in accordance to yet another embodiment of the present invention.

Comparatively, FIGS. 6A and 6B illustrate the capability of the remote system controller of the present invention to maintain synchronized copies of data center when facing a break down in communication, in accordance with one embodiment of the present invention. As shown, the data center 109 is in communication with user computer systems 113*a*-113*c* through the Internet 117. As shown, the data center 109 has dispatched a refresh command R1 to a user interface 113*a*-UI. As also shown, the data center 109 has received a refresh acknowledged command R1-Ack from the user interface 113*a*-UI, signaling the successful refreshing of the copy of data within the user computer system 113*a*.

As the data center refreshes the data center copies sequentially, the data center 109 is shown to have dispatched a refresh command R2 to the user interface 113*b*-UI. However, due to a break down in communication, the user interface 113*b*-UI has not received the dispatched refresh command R2. As a consequence, the copy of data center in user computer system 113*b* will not be updated and the user interface 113*b*-UI will not dispatch a refresh acknowledged R2-Ack command back to the data center. In one exemplary embodiment, this occurs as the data center 109 is configured to await the receipt of the acknowledgment for a specific length of time. Once the internal clock reaches a previously determined period (e.g., 30 seconds) and it is determined that the data center has not yet received an acknowledgment from the user interface 113*b*-UI, the data center is configured to automatically unregister the user computer system 113*b*. Thus, as shown, the list in 115" does not include the user computer system 113*b*. Upon unregistering the user computer system 113*b*, the data center dispatches a refresh command R3 to user interface 113*c*-UI. As shown, the refresh command R3 has been acknowledged by the refresh acknowledged command R3-Ack dispatched by the user computer system 113*b*.

In one envisioned embodiment, to eliminate the possibility of the copies of the data center contained within the user computer systems not being updated, the user computer systems of the present invention are configured to register with the data center upon passage of a predetermined length of time. For instance, in one example, the user interface 113*b*-UI is configured to implement a timed scheduler to detect not having been refreshed for a predetermined length of time (e.g., 30 seconds). In such a scenario, the user interface 113*b*-UI dispatches a register command Reg2 to the data center 109 using the Internet 117. Upon receiving the register command Reg2, the data center 109 is configured to re-register the user interface 113*b*-UI, updating 115" to include the user interface 113*b*-UI as an active user computer system.

Figure 7:
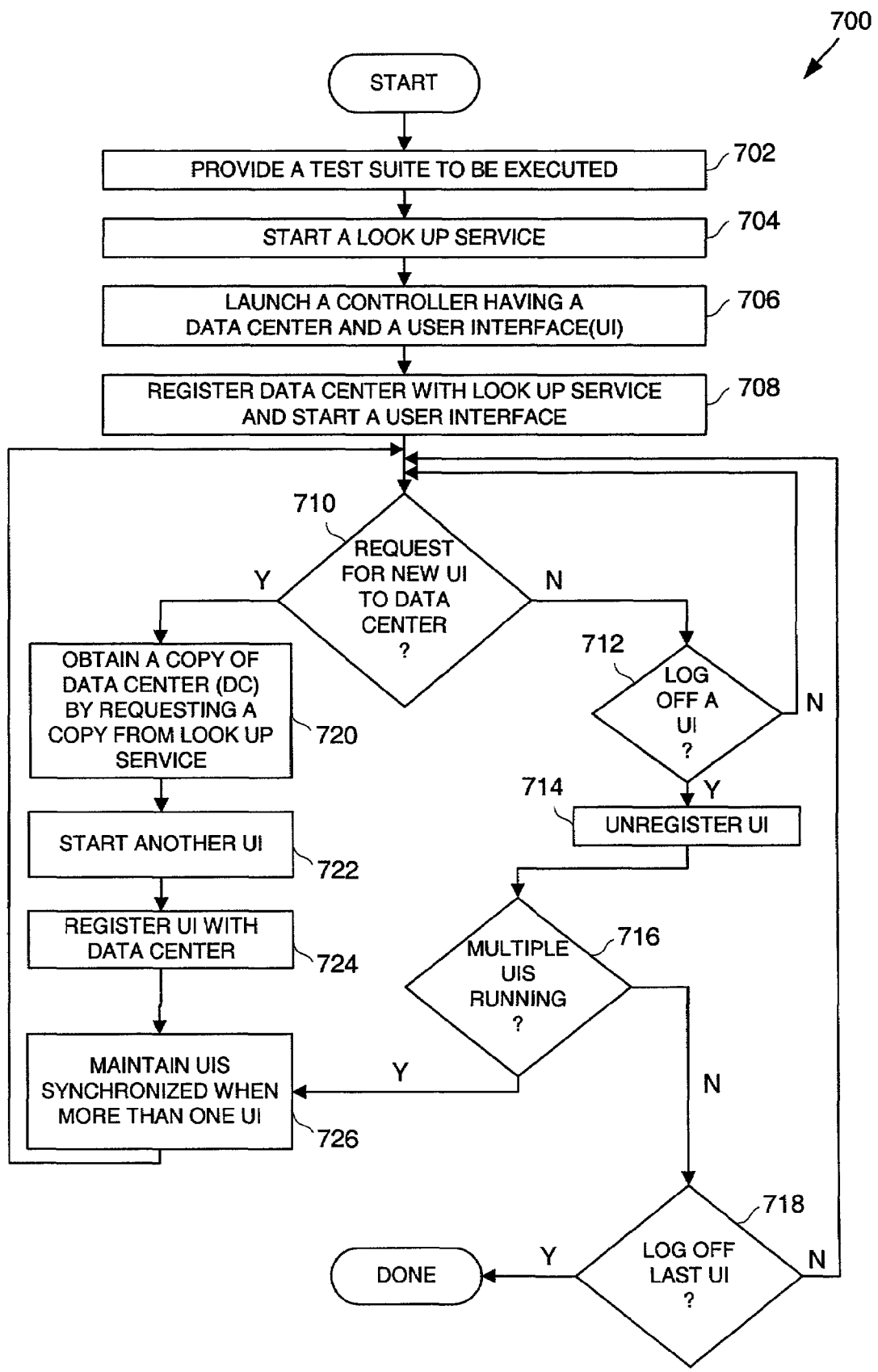
FIG. 7 is a flow chart diagram illustrating a method operations implemented by a remote system controller in communicating a plurality of users in a distributed processing framework (DPF) system, in accordance with yet another embodiment of the present invention.

FIG. 7 depicts a flow chart diagram 700 illustrating the method operations performed by a system controller and remote user computer systems of the present invention to access, schedule, distribute, and monitor status of a process execution, in accordance with one embodiment of the present invention. The method begins in operation 702 in which a test suite to be executed is provided. As discussed previously, in one example, the test suite provides information such as the number of test execution requests currently being processed or waiting to be processed, the number of test systems available to execute a certain type of a test suite, the status of the test suites being executed, etc. Then, a look up service is started in operation 704. Next, a system controller having a data center component and a user interface component is launched. In one example, the system controller is launched by turning on a master computer system configured to run the system controller. Moving to operation 708, the data center component of the system controller is registered with the look up service and a user interface is started.

Continuing to operation 710, a determination is made as to whether a request for a new user interface to the data center has been received. If a determination is made that a new user interface is being requested, the method continues to operation 720 in which the requesting user interface obtains a copy of the data center by requesting a copy from the look up service. Specifically, this occurs by the requesting user interface identifying itself to the look up service and providing the look up service with its address. Upon receiving the request for the copy of the data center, the look up service communicates with the data center relaying the new user interface identification and address. Next, in operation 722, a new user interface is started in the system controller. Then, in operation 724, the requesting user interface is registered with the data center subsequent to which the user interface is provided with a copy of the data center.

Moving to operation 726, the data center maintains the copies of data center provided to each of the user interfaces synchronized, when there are more than one user interface is present. In one example, this is achieved by the data center dispatching a refresh command to each user interface and obtaining a refresh acknowledged command from each of the user interfaces. If a refresh acknowledged command is not received, the data center is configured to unregistered that specific user interface from the list of active user interfaces.

However, if in operation 710 a determination is made that a new request has been received, in operation 712, a determination is made as to whether a request to log off a user interface has been received. If no request to log off a user interface has been received, the method continues to operation 710, waiting for new user interface requests. But, if a user interface has requested to be logged off, the method continues to operation 714, in which the user interface is logged off.

Then, in operation 716 a determination is made as to whether a multiplicity of user interfaces are still running. If multiple user interfaces are running, the method proceeds to operation 726 in which the user interface copies of data center are maintained synchronized. However, if it is determined that no other user interfaces are running, the method continues to operation 718 in which a determination is made as to whether the last user interface is being logged off. If it is not the last user that is being logged off, the method continues to operation 710 wherein the method awaits the submission of new user interface requests.

Figure 8:
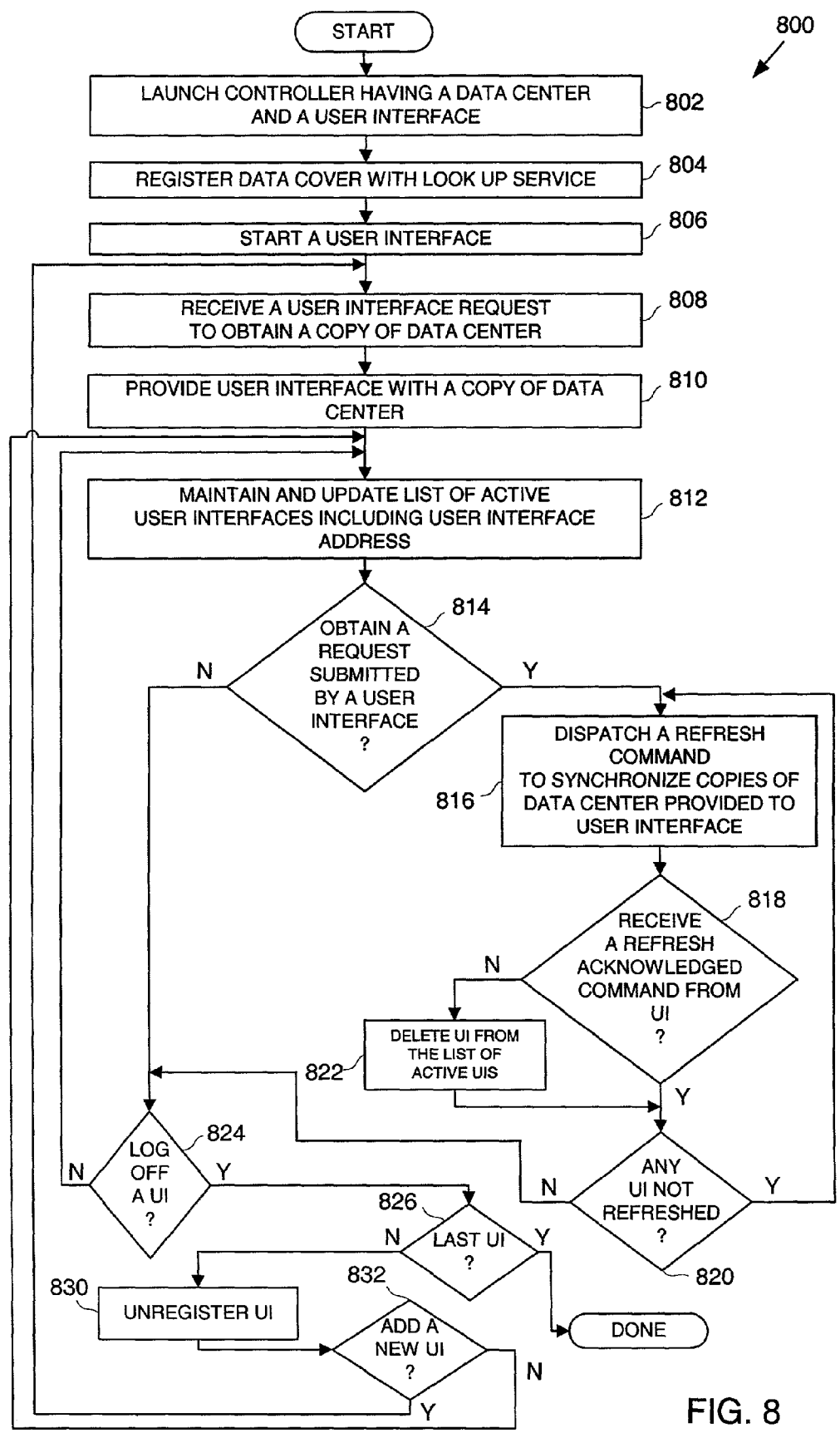
FIG. 8 is a flow chart diagram illustrating a method operations implemented by a remote system controller in a distributed processing framework (DPF) system, in accordance with yet another embodiment of the present invention.

FIG. 8 depicts a flow chart diagram 700 illustrating the method operations performed by a system controller to update remote user computer systems, in accordance with one embodiment of the present invention. The method begins in operation 802 in which a system controller having a data center component and a user interface component is launched. Then, in operation 804, the data center is registered with the look up service, which is followed by operation 806 wherein the user interface component of the system controller is started.

Proceeding to operation 808, a request is received from a user interface to obtain a copy of the data center. This may be performed by user interface communicating with the look up service requesting a copy of the data center. In one example, when communicating with the look up service, the user interface is configured to identify itself and to provide the look up service with its address. At this point, the look up service is configured to relay the user interface's request to the data center. Upon receiving this request, in operation 810, the data center provides the user interface with a copy of the data center. Thereafter, in operation 812, the data center maintains and updates a list of active user interfaces as well as their corresponding addresses.

Proceeding to operation 814 it is determined whether a request has been submitted by a user interface. If a new request has been received, in operation 816, the data center dispatches a refresh command to synchronize copies of data center provided to user interface. In one example, the synchronization process is achieved sequentially. However, in a different embodiment, the user interfaces may be synchronized implementing any suitable method (e.g., using a single thread to synchronize the user interfaces sequentially and synchronously, using a single thread to synchronize the user interfaces asynchronously, using multiple threads wherein each thread refreshes one user interface synchronously, etc.).

Thereafter, in operation 818, it is determined whether the data center has received a refresh acknowledged command from the user interface. If a refresh acknowledged command has been received, the method continues to operation 820 in which it is determined whether there are any user interfaces that have not been refreshed. If there are, the method continues to operation 816 in which a refresh command is dispatched to that user interface. If all the user interfaces have been refreshed, the method continues to operation 824 described in more detail below.

If in operation 818 it is determined that a refresh acknowledged command has not been received from the user interface, the method continues to operation 822 in which the user interface is removed from the list of the active user interfaces. Thereafter, the method continues to operation 820.

If in operation 814 it is determined that a user interface request to modify data has not been received, the method continues to operation 824 in which it is determined whether a user interface has requested to be logged off. If no such request has been received, the method continues to operation 812 in which the list of active user interfaces is updated. However, if it is determined that a user has requested to be logged off, the method proceeds to operation 826 in which it is determined whether that user interface is the last user interface. If it is determined that the user interface is not the last user interface, the method continues to operation 830 in which the data center unregisters the user interface. That is, the data center removes that user interface from the list of active user interfaces. Continuing to operation 832, it is determined whether a new user interface is requesting access to the data center (i.e., if a new user interface is being added). If a new user interface is being added, the method proceeds to operation 808 in which the data center receives a request from a user interface to obtain a copy of the data center. However, if it is determined a new user interface is not being added, the method continues to operation 812 in which the list of active user interfaces is updated. In this manner, the embodiments of the present invention advantageously enable multiple user interfaces to gain access to the data center, modify data, submit new test suites, or kill a currently running test suite irrespective of the user interface location.

Figure 9:
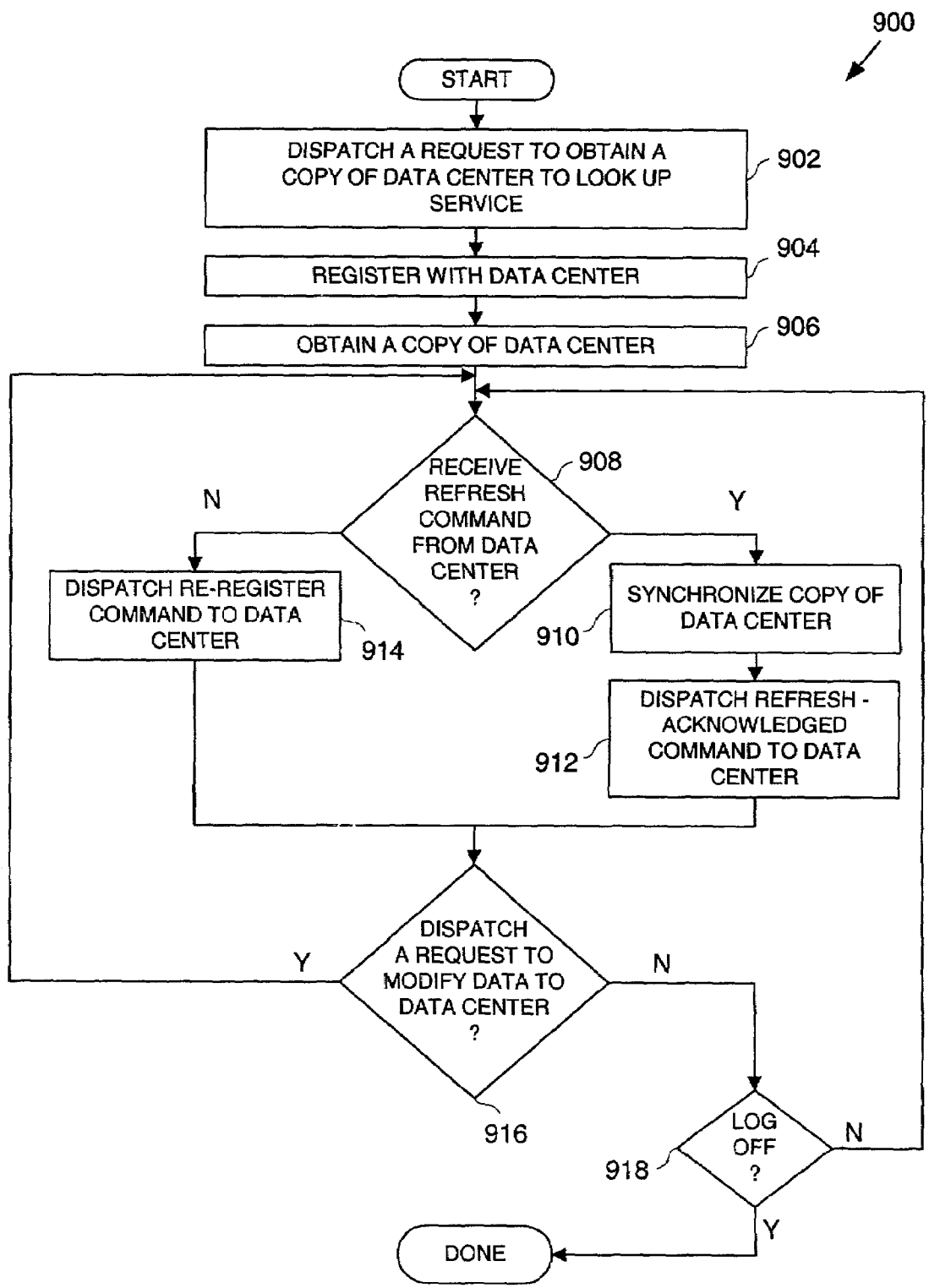
FIG. 9 is a flow chart diagram illustrating the method operations implemented by a plurality of user computer system to interface with a remote system controller of a distributed test framework system in executing a test suite, in accordance with still another embodiment of the present invention.

Reference is made to FIG. 9 depicting a flow chart diagram 700 illustrating the method operations performed by the remote user computer systems of the present invention to access, schedule, distribute, or monitor status of the process execution using the remote system controller, in accordance with one embodiment of the present invention. The method begins in operation 902 in which a request to obtain a copy of the data center is dispatched to the look up service. Then, in operation 904, the user interface registers with the data center followed by obtaining a copy of the data center in operation 906.

Proceeding to operation 908, a determination is made as to whether the user interface has received a refresh command from the data center. If the refresh command has been received, the user interface copy of the data center is synchronized with the data center. Then, in operation 912, the user interface dispatches a refresh acknowledged command to the data center. However, if in operation 908 it is determined that the user interface has not received a refresh command, the user interface is configured to dispatch a re-register command to the data center, re-registering with the data center.

Thereafter, the method proceeds to operation 916 in which a determination is made as to whether the user interface is dispatching a new request to the data center. If it is determined that a request to modify data in the data center is being dispatched, the method continues to operation 908 in which the method determines whether a new refresh command has been dispatched. If a request to modify data has not been dispatched, the method continues to operation 918 in which a determination is made as to whether the user interface is logging off. If the user interface is not logging off, the method continues to operation 908, in which the user interface determines whether a new refresh command has been received.

Thus, in accordance with embodiments of the present invention, a plurality of user interfaces having different hardware/software configurations and platforms and defined in different buildings and localities can access data within a data center component of the system controller. In this manner, different user interfaces can be used to share the same data within the data center, thus providing a faster and more convenient way of managing the test suite distribution and execution.

The advantages of the present invention are numerous. Most notably, the system controller of the present invention enables a plurality of users to conveniently remove a test execution request submitted for execution, submit a test execution request, maintain the status of system, and view the reports and logs during the execution of the process. Another advantage of the remote system controller of the present invention is that it can simultaneously accommodate a network of user interfaces, which span over a large geographical area.

Although the present invention mainly describes exemplary embodiments of a remote system controller used in a distributed test framework system design to execute a test suite, it must be understood by one having ordinary skill in the art that the remote system controller of the present invention can be implemented in any distributed processing framework system used to run any type of computer process.

Additionally, although the embodiments of the present invention implement one remote system controller of the present invention, one having ordinary skill in the art must appreciate that in a different embodiment, any number of remote system controllers can be implemented. In such scenarios, each remote system controller may be configured to include a different data center, each of which is configured to register its associated data center with the Jini look up service, thus notifying the other system controllers of its existence.

Additionally, although the present invention is described based on the Jini technology, other network technologies having the capability to create an ad-hoc group of processing resources may be implemented (e.g., RMI, TCP/IP Sockets, etc.). Furthermore, although the present invention implements Java programming language, other programming languages may be used to implement the embodiments of the present invention (e.g., C, $C_{++}$, any object oriented programming language, etc.).

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A process execution management system, the system comprising:
    a controller system being accessible over a network to enable a remote user access to data managed by the controller system, including,
        a data center component configured to include data required to execute a process by a processing resource that is in communication with the controller system;
        a first user interface component instance for enabling a first user interface to provide an interface to a first copy of the data center component, the first user interface being configured to notify the data center component of a change to the first copy of the data center component; and
        a second user interface component instance for enabling a second user interface to provide the interface to a second copy of the data center component, the second user interface being configured to notify the data center component of a change to the second copy of the data center component,
    wherein a kernel copy of the data center component is configured to be changed so as to include the change to the first copy of the data center component upon approval of the change by the data center component, and the data center component is configured to issue an update including the change to the first copy of the data center component to the second user interface to maintain synchronized data between the first and second user interfaces having access to the data center component, and
    further wherein a kernel copy of the data center component is configured to be changed so as to include the change to the second copy of the data center component upon approval of the change by the data center component, and the data center component is configured to issue an update to the first user interface to maintain synchronized data between the first and second user interfaces having access to the data center component.

2. A process execution management system of claim 1, wherein the data center component is configured to register with a registry service.

3. A process execution management system of claim 2, wherein each of the user interfaces obtains a copy of the data center component by communicating a request to the registry service.

4. A process execution management system of claim 2, wherein each of the user interfaces provides the registry service with a user interface identification.

5. A process execution management system of claim 2, wherein each of the user interfaces provides the registry service with a user interface address.

6. A process execution management system of claim 5, wherein the data center component implements a refresh command to update each of the copies of the data center component.

7. A process execution management system of claim 6, wherein the data center component maintains each of the user interface identifications and each of the user interface addresses in an active list.

8. A process execution management system of claim 6, wherein the data center component awaits receiving a refresh acknowledged command from each of the user interfaces.

9. A process execution management system of claim 7, wherein the data center component removes a user interface identification and a user interface address of the user interface failing to dispatch a refresh acknowledged command to the data center component.

10. A process execution management system of claim 6, wherein each of the user interfaces awaits receiving the refresh command for a predetermined period of time.

11. A process execution management system of claim 10, wherein each of the user interfaces re-registers with the data center component if the user interface has not received the refresh command upon the passage of the predetermined period of time.

12. A method for remotely accessing, scheduling, monitoring, and submitting a process, the method comprising:
    launching a controller code, the controller code configured to include a data center and a user interface code;
    registering the data center with a registry service;
    initiating a first instance of a user interface component by the controller code;
    maintaining a data center copy provided to a first user interface synchronized with a kernel copy of the data center if the data center has received a request to change data in another data center copy provided to another, user interface from the another user interface wherein the synchronization is upon approval of the change by the data center; and
    monitoring an active status of the first user interface if the data center has not received a request to change the data in the data center copy from the first user interface.

13. A method for remotely accessing, scheduling, monitoring, and submitting a process as recited in claim 12, further comprising:
    initiating another instance of the user interface component by the controller code; and
    maintaining the another data center copy provided to the another user interface synchronized with the data center if the data center has received a request to change data in the first data center copy provided to the first user interface from the first user interface.

14. A method for remotely accessing, scheduling, monitoring, and submitting a process as recited in claim 12, wherein maintaining the data center copy provided to the first user interface synchronized with the data center includes,
    initiating the another instance of the user interface component by the controller code;
    obtaining the data center copy by another user interface;
    registering the another user interface with the data center; and
    updating the data center upon a modification to the another data center copy provided to the another user interface.

15. A method for remotely accessing, scheduling, monitoring, and submitting a process as recited in claim 14, wherein updating the data center upon the modification to the another data center copy provided to the another user interface includes,
    receiving a request to modify the data center copy from the another user interface;
    dispatching a refresh command to the first user interface, the refresh command being configured to update the data center copy provided to the first user interface so as to maintain the data center copy provided to the first user interface synchronized with the data center; and
    awaiting a receipt of a refresh acknowledged command from the first user interface for a predetermined period of time.

16. A method for remotely accessing, scheduling, monitoring, and submitting a process as recited in claim 15, wherein the data center unregisters the first user interface if the refresh acknowledged command has not been received from the first user interface for the predetermined period of time.

17. A method for remotely accessing, scheduling, monitoring, and submitting a process as recited in claim 16, wherein the first user interface is configured to re-register with the data center if the data center copy of the first user interface has not been refreshed for a specific length of time.

18. A method for providing synchronized data to a plurality of remote user interfaces, the method comprising:
    launching a controller code having a data center and a user interface code;
    registering the data center with a registry service;
    initiating one or more user interfaces;
    providing a copy of the data center to one or more user interfaces upon receiving a request from the one or more user interfaces;
    maintaining and updating a list of one or more active user interfaces, the list of one or more active user interfaces is configured to include a user interface identity and a user interface address for each of the one or more active user interfaces;
    maintaining a one or more data center copies and a kernel copy of the data center synchronized if a request to change data in any of the one or more data center copies is received from any of the one or more user interfaces wherein the synchronization is upon approval of the change by the data center; and
    monitoring an active status of the one or more user interfaces if the request to change data in any of the one or more data center copies has not been received from any of the one or more user interfaces.

19. A method for providing synchronized data to a plurality of remote user interfaces as recited in claim 18, wherein maintaining the one or more data center copies and data center code synchronized includes,
    dispatching a refresh command to the one or more user interfaces;

awaiting for a previously determined period of time to receive a refresh acknowledged command from the one or more user interfaces; and receiving the refresh acknowledged command from the one or more user interfaces.

20. A method for providing synchronized data to a plurality of remote user interfaces as recited in claim 19, the method further including, deleting a user interface of the one or more user interfaces from the list of one or more active user interfaces if refresh acknowledged command has not been received from the user interface of the one or more user interfaces.

21. A method for providing synchronized data to a plurality of remote user interfaces as recited in claim 20, the method further including, receiving a re-register command from the user interface of the one or more user interfaces if the user interface has not received the refresh command for a specific length of time.

* * * * *